US011720874B2

(12) United States Patent
Kubota

(10) Patent No.: US 11,720,874 B2
(45) Date of Patent: Aug. 8, 2023

(54) SALES PROCESSING APPARATUS WITH EARLY FAILURE DETECTION AND METHOD FOR EARLY FAILURE DETECTION IN A SALES PROCESSING APPARATUS

(71) Applicant: TOSHIBA TEC KABUSHIKI KAISHA, Tokyo (JP)

(72) Inventor: Takahide Kubota, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 109 days.

(21) Appl. No.: 17/122,784

(22) Filed: Dec. 15, 2020

(65) Prior Publication Data

US 2021/0264400 A1    Aug. 26, 2021

(30) Foreign Application Priority Data

Feb. 25, 2020    (JP) .................................. 2020-029584

(51) Int. Cl.
   *G06Q 20/20*    (2012.01)
   *G05B 23/02*    (2006.01)
   (Continued)

(52) U.S. Cl.
   CPC ....... *G06Q 20/208* (2013.01); *G05B 23/0283* (2013.01); *G06K 7/1413* (2013.01);
   (Continued)

(58) Field of Classification Search
   CPC .......... G07G 3/00; G07G 1/0054; G07G 1/01; G07G 3/006; G06Q 20/18; G06Q 20/20;
   (Continued)

(56) References Cited

U.S. PATENT DOCUMENTS

| 4,595,985 A | * | 6/1986 | Sakakiya | ............. | G06Q 20/206 |
| | | | | | D18/4.1 |
| 5,343,025 A | * | 8/1994 | Usui | ........................ | G07G 1/12 |
| | | | | | 235/383 |

(Continued)

FOREIGN PATENT DOCUMENTS

| CN | 107665553 A | 2/2018 |
| CN | 110689683 A | 1/2020 |
| JP | 2016071504 A | 5/2016 |

OTHER PUBLICATIONS

Extended European Search Report dated Jun. 25, 2021, mailed in counterpart European Application No. 21154925.8, 7 pages.

(Continued)

*Primary Examiner* — Daniel I Walsh
(74) *Attorney, Agent, or Firm* — Kim & Stewart LLP

(57) ABSTRACT

A sales processing apparatus includes a processor and an input and output unit configured to perform an operation for a sales transaction processing. The processor is configured to acquire the time required for the input and output unit to perform the operation for the sales transaction processing of a sales transaction, then determine whether the time required for the input and output unit to perform the operation during the sales transaction exceeds a reference time for the input and output unit to perform the operation. A notification is output if the time required for the input and output unit to perform the operation during the sales transaction exceeds the reference time.

6 Claims, 11 Drawing Sheets

(51) Int. Cl.
   *G06K 7/14* (2006.01)
   *G07F 5/24* (2006.01)
   *G06Q 20/18* (2012.01)
   *G07D 11/00* (2019.01)
   *G07D 11/60* (2019.01)
   *G06K 7/10* (2006.01)

(52) U.S. Cl.
   CPC ......... *G06Q 20/18* (2013.01); *G07D 11/0087* (2013.01); *G07F 5/24* (2013.01); *G06K 2007/10524* (2013.01); *G06Q 20/202* (2013.01); *G06Q 20/204* (2013.01); *G06Q 20/209* (2013.01); *G07D 11/60* (2019.01); *G07D 2201/00* (2013.01); *G07D 2211/00* (2013.01)

(58) Field of Classification Search
   CPC ............. G06Q 20/208; G07D 2211/00; G07D 2201/00; G07D 11/0087; G07F 5/24; G05B 23/0283; G06K 2007/10524; G06K 7/1404
   See application file for complete search history.

(56) References Cited

U.S. PATENT DOCUMENTS

| | | | | |
|---|---|---|---|---|
| 6,550,671 | B1* | 4/2003 | Brown | G07D 11/30 235/379 |
| 6,739,501 | B2* | 5/2004 | Murakami | G06Q 20/20 705/16 |
| 8,091,777 | B2* | 1/2012 | Takahashi | G07D 11/10 235/375 |
| 8,255,047 | B1* | 8/2012 | Wohlgemuth | A61N 1/3622 607/9 |
| 9,449,474 | B2* | 9/2016 | Kurosawa | G07G 1/0009 |
| 10,796,537 | B1* | 10/2020 | Farivar | G07F 19/207 |
| 10,810,636 | B1* | 10/2020 | Sulejmani | H04W 4/027 |
| 10,943,424 | B1* | 3/2021 | Pham | G01G 19/42 |
| 11,127,054 | B1* | 9/2021 | Sulejmani | H04W 4/029 |
| 2005/0192831 | A1* | 9/2005 | Ellison | G06Q 10/06398 705/345 |
| 2007/0007078 | A1* | 1/2007 | Johnson | G07G 1/0054 186/61 |
| 2009/0057423 | A1* | 3/2009 | Nobuhara | G07D 1/00 235/7 A |
| 2009/0184034 | A1* | 7/2009 | Doi | G07D 11/50 705/16 |
| 2010/0230231 | A1* | 9/2010 | Uesaka | G07F 9/10 194/350 |
| 2011/0308913 | A1* | 12/2011 | Doi | G07F 19/209 194/216 |
| 2012/0054051 | A1* | 3/2012 | Hirono | G07G 1/0036 705/16 |
| 2012/0059704 | A1* | 3/2012 | Yanagi | G07G 1/0045 705/14.27 |
| 2013/0325599 | A1* | 12/2013 | Yeri | G06Q 40/02 705/14.49 |
| 2014/0274312 | A1* | 9/2014 | Walters, Jr. | G07F 17/3248 248/311.2 |
| 2014/0379501 | A1* | 12/2014 | Jungclaus | G07G 1/0027 705/18 |
| 2015/0001299 | A1* | 1/2015 | Crooks | G06K 7/1095 235/440 |
| 2016/0117654 | A1* | 4/2016 | Crist | G07F 19/203 705/16 |
| 2016/0180477 | A1* | 6/2016 | Hurst | G11B 27/3081 705/7.28 |
| 2016/0217655 | A1* | 7/2016 | Walters, Jr. | G07F 17/3251 |
| 2017/0185249 | A1* | 6/2017 | Gotanda | G06F 3/04886 |
| 2018/0025592 | A1* | 1/2018 | Nishio | G07G 1/0027 235/7 A |
| 2018/0033024 | A1* | 2/2018 | Latapie | G06Q 30/0201 |
| 2019/0073854 | A1* | 3/2019 | Machida | G07G 1/00 |
| 2019/0378105 | A1* | 12/2019 | Freeman | B23P 15/005 |
| 2020/0004460 | A1* | 1/2020 | Gould | G06F 3/0613 |
| 2020/0327764 | A1* | 10/2020 | Nishida | G06Q 20/206 |
| 2021/0090376 | A1* | 3/2021 | Ohta | G06Q 10/20 |
| 2021/0117948 | A1* | 4/2021 | Voss | G06N 3/08 |
| 2021/0264396 | A1* | 8/2021 | Sugimoto | G07D 11/16 |
| 2021/0264400 | A1* | 8/2021 | Kubota | G07G 3/00 |
| 2022/0129918 | A1* | 4/2022 | Tang | G06Q 10/06311 |

OTHER PUBLICATIONS

Chinese Office Action dated Aug. 22, 2022, mailed in counterpart Chinese Application No. 202011405597.X, 15 pages (with translation).

\* cited by examiner

SALES PROCESSING APPARATUS WITH EARLY FAILURE DETECTION AND METHOD FOR EARLY FAILURE DETECTION IN A SALES PROCESSING APPARATUS

CROSS-REFERENCE TO RELATED APPLICATION

This application is based upon and claims the benefit of priority from Japanese Patent Application No. 2020-029584, filed on Feb. 25, 2020, the entire contents of which are incorporated herein by reference.

FIELD

Embodiments described herein relate generally to an information processing apparatus, such as a sales processing apparatus, and a method for predicting failures of such apparatuses.

BACKGROUND

It has been proposed to perform automated failure diagnosis operations for a machine during a period in which the machine is not being actively used. In this context, the failure diagnosis operations are performed on the machine in order to detect a defective operation of the machine or component of the machine.

However, while it may be possible to detect an already defective operation in the related art, operations for detecting the possibly predictive signs of defective operation is not performed. Furthermore, in this related art a predictive failure diagnosis is not performed during the active use of the machine and thus some amount of downtime is required in the related art.

DETAILED DESCRIPTION

In general, according to one embodiment, a sales processing apparatus includes a processor and an input and output unit configured to perform an operation for a sales transaction processing. The processor is configured to acquire the time required for the input and output unit to perform the operation for the sales transaction processing of a sales transaction, then determine whether the time required for the input and output unit to perform the operation during the sales transaction exceeds a reference time for the input and output unit to perform the operation. A notification is output if the time required for the input and output unit to perform the operation during the sales transaction exceeds the reference time.

First Embodiment

A self-service POS terminal 10 including a function for detecting an early sign of defects.

Description of Overall Configuration of Self-Service POS Terminal

Figure 1:
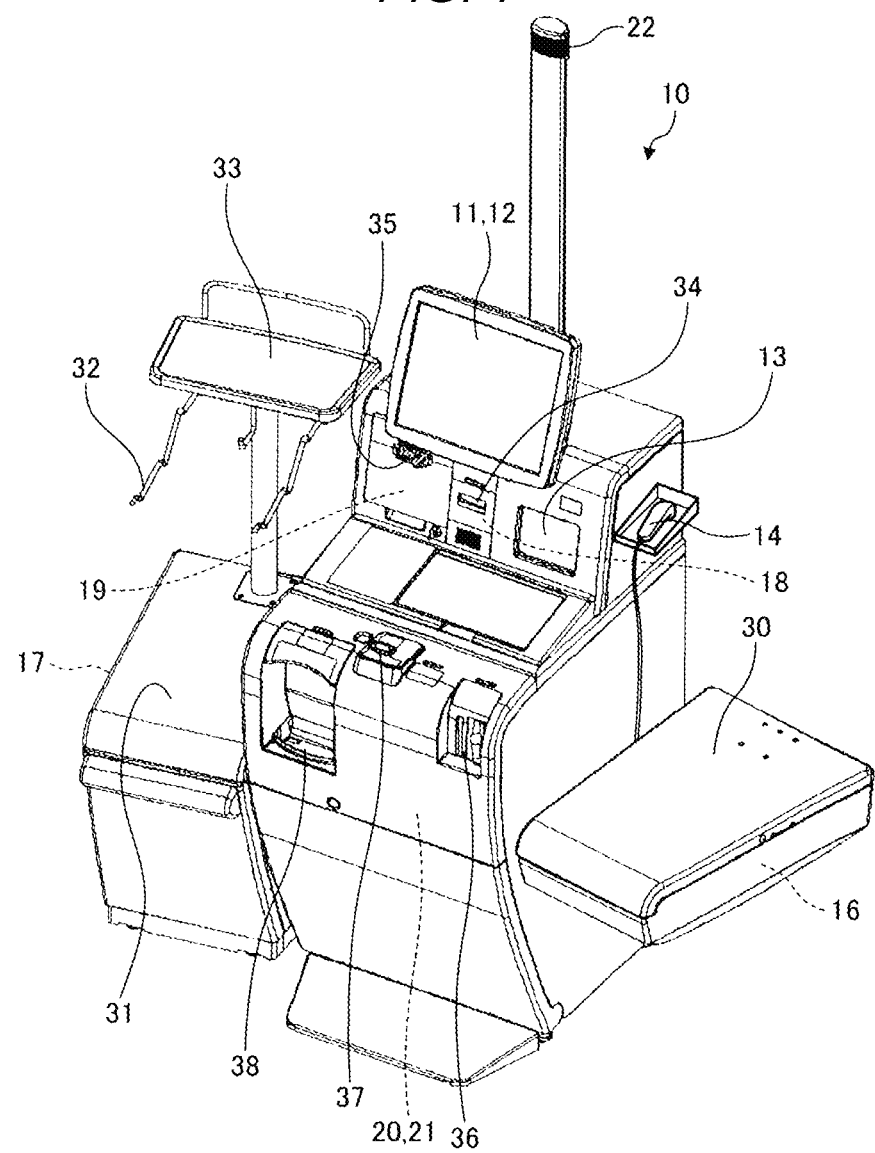
FIG. 1 is a schematic perspective view of a self-service POS terminal according to a first embodiment.

A self-service POS terminal 10 according to the first embodiment will be described with reference to FIG. 1. FIG. 1 is a schematic perspective view illustrating a self-service POS terminal 10 in the first embodiment.

The self-service POS terminal 10 includes a display 11, a scanner 13, and a handheld ("handy") scanner 14. A touch panel 12 is disposed on the surface of the display 11. The self-service POS terminal 10 is one example of an information processing apparatus in the present disclosure.

The display 11 is a liquid crystal display device, for example. During operation, the display 11 displays a guide screen for informing a customer about operating the self-service POS terminal 10. In particular, during merchandise registration operations, the display 11 displays a registration selection screen for assisting in the registration of merchandise and the like. The display 11 displays merchandise information registered by either the scanner 13 or the handy scanner 14 reading a code symbol attached to the item of merchandise. The display 11 displays the total amount due for the registered merchandise, a deposit amount (amount tendered by the customer), a change due amount, and the like. The display 11 can display accounting screen permitting a customer to select a payment method for settlement of the sales transaction.

The scanner 13 and the handy scanner 14 each read a code symbol, such as a barcode or a two-dimensional code, that has been attached to each item of merchandise. For example, the scanner 13 includes an optical imaging element such as a charge coupled device (CCD) or a complementary metal oxide semiconductor (CMOS) and captures an image of an imaging area in front of a reading window. The customer causes the scanner 13 to read a code symbol by passing the merchandise near the reading window of the scanner 13. For larger merchandise, it may be difficult to pass the merchandise (more particularly the code symbol on the item of merchandise) by the reading window of the scanner 13. In such a case, the customer can use the handy scanner 14 to read the code symbol. Code information, such as a Japanese article number (JAN) code and/or CODE128, which enables a merchandise to be uniquely identified is encoded in the code symbol. In some examples, either of the scanner 13 and the handy scanner 14 may identify merchandise using generic object recognition (object recognition) or the like.

A merchandise placing table 30 is provided on a right side of the self-service POS terminal 10. The customer places merchandise, which may still be in a shopping basket or the like, on the merchandise placing table 30. In general, the merchandise placing table 30 is to be used for merchandise which has not yet been registered. A merchandise placing table 31 is provided on a left side of the self-service POS terminal 10. In general, the merchandise placing table 31 is to be used for merchandise that has been registered (e.g., by use of the scanner 13 or the handy scanner 14). A bag hook 32 on which a customer can hang a bag for holding registered merchandise is provided above the merchandise placing table 33. A temporary placing table 33 on which a customer can temporarily place the registered merchandise before placing the merchandise into a bag or the like is also provided above the merchandise placing table 31. A weighing device 16 is provided in the merchandise placing table 30. The weighing device 16 includes a load cell and an analog-digital conversion circuit and measures the total weight of the shopping basket and the unregistered merchandise placed on the merchandise placing table 30. A weighing device 17 is provided in the merchandise placing table 31. The weighing device 17 includes a load cell and an analog-digital conversion circuit and measures the total weight to be applied to both the merchandise placing table 31 and the temporary placing table 33. The self-service POS terminal 10 performs a notification (a warning) when the total weight of registered merchandise differs by some predetermined amount or more from the unregistered merchandise. That is, when the difference between the total weight measured by the weighing device 16 and the total weight measured by the weighing device 17 is too large, a warning is issued.

The self-service POS terminal 10 further includes a card reader 18 that reads a member points card, a credit card, or the like of a customer. The card reader 18 reads a card that is inserted in a card insertion slot 34. The self-service POS terminal 10 includes a receipt printer 19 that prints a receipt. The receipt printed by the receipt printer 19 is dispensed from a receipt dispensing port 35.

The self-service POS terminal 10 includes a banknote deposit and withdrawal device 20 and a coin deposit and withdrawal device 21. These devices respectively calculate, during settlement processing, the value of the banknotes deposited by the customer and the value of the coins deposited by the customer. These devices, furthermore, dispense banknotes and coins as required to return change due to the customer in the settlement processing. That is, the banknote deposit and withdrawal device 20 performs a banknote deposit and dispensing process. The coin deposit and withdrawal device 21 performs a coin deposit and dispensing process. A customer deposits a banknote or receives a banknote as change, through a banknote deposit and withdrawal port 36. A customer inserts coins via coin insertion port 37 and receives coins from coin ejection port 38.

A pole is provided on the upper surface of the self-service POS terminal 10. A warning lamp 22 is provided on the upper end of the pole. The warning lamp 22 lights, for example, when an operation performed in the self-service POS terminal 10 has a problem, when the self-service POS terminal 10 has a problem, or when a salesclerk is called.

Description of Hardware Configuration of Self-Service POS Terminal

Figure 2:
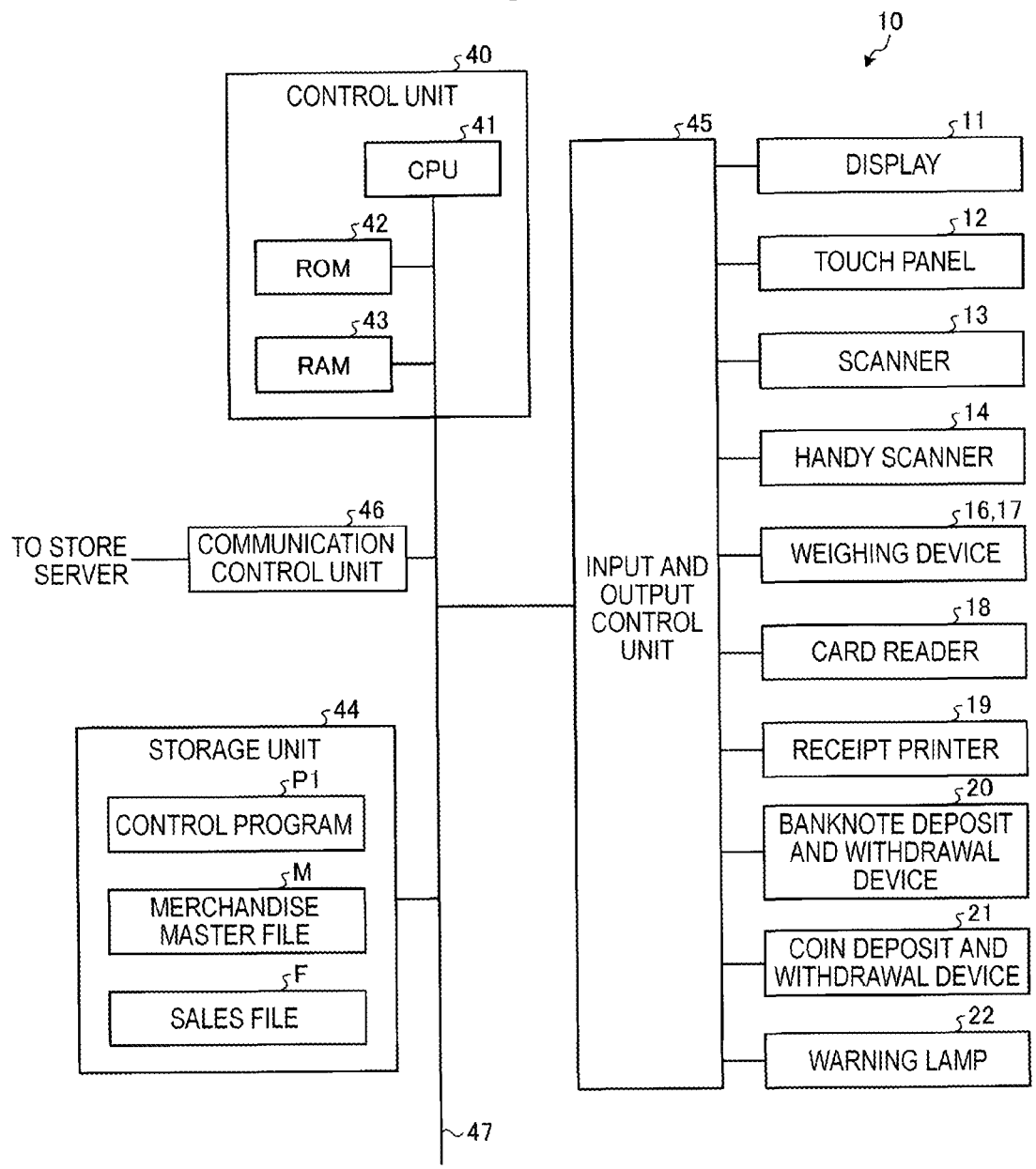
FIG. 2 is a block diagram illustrating aspects of a self-service POS terminal in a first embodiment.

Next, a hardware configuration of the self-service POS terminal 10 will be described with reference to FIG. 2. FIG. 2 is a hardware block diagram illustrating an example of the hardware configuration of the self-service POS terminal 10 in the first embodiment. As illustrated in FIG. 2, the self-service POS terminal 10 includes a control unit 40, a storage unit 44, an input and output (I/O) control unit 45, and a communication control unit 46.

The control unit 40 can have the configuration of a general purpose computer including a central processing unit (CPU) 41, a read only memory (ROM) 42, and a random access memory (RAM) 43. The control unit 40 can be referred to as a controller 40. The CPU 41 reads various programs, data files, and the like stored in the ROM 42 or the storage unit 44 loads the program, the data files, and the like onto the RAM 43. The CPU 41 operates in accordance with these various programs, the data files, and the like to control operations of the self-service POS terminal 10.

The control unit 40 is connected to the storage unit 44, the I/O control unit 45, and the communication control unit 46 via an internal bus 47.

The storage unit 44 holds stored information even though the power is cut off. The storage unit 44 is a hard disk drive (HDD), for example. A non-volatile memory such as a flash memory may be provided instead of the HDD. The storage unit 44 stores programs including a control program P1. The control program P1 is a program for providing the described functions of the self-service POS terminal 10.

The control program P1 may be incorporated in the ROM 42 in advance. The control program P1 may be in a file in a format that is installable or is executable by the control unit 40. The control program P1 can be stored in a non-transitory computer readable recording medium such as a CD-ROM, a flexible disk (FD), a CD-R, a digital versatile disc (DVD). The control program P1 may be stored on a computer connected to a network such as the Internet and then downloaded via the network. The control program P1 may be provided or distributed via a network such as the Internet.

The storage unit 44 stores a merchandise master file M. The merchandise master file M is a master file in which merchandise information, such as the name and a unit price, for each item of merchandise is stored in association with a merchandise code. Communication can be performed between the self-service POS terminal 10 and a store server or the like to continually update merchandise master file M on the self-service POS terminal 10.

The storage unit 44 also stores a sales file F in which merchandise information relating to items of merchandise being purchased by a customer in the sales transaction is recorded.

The I/O control unit 45 connects, via the internal bus 47, to the control unit 40. The I/O control unit 45 connects the control unit 40 to the display 11, the touch panel 12, the scanner 13, the handy scanner 14, the weighing devices 16 and 17, the card reader 18, the receipt printer 19, the banknote deposit and withdrawal device 20, the coin deposit and withdrawal device 21, and the warning lamp 22. Collectively, each of these connected items can be referred to as "input and output devices" of the self-service POS terminal 10.

The communication control unit 46 controls communication between the self-service POS terminal 10 and the store server or the like to permit the transfer of various information.

Description of Functional Configuration of Self-Service POS Terminal

Figure 3:
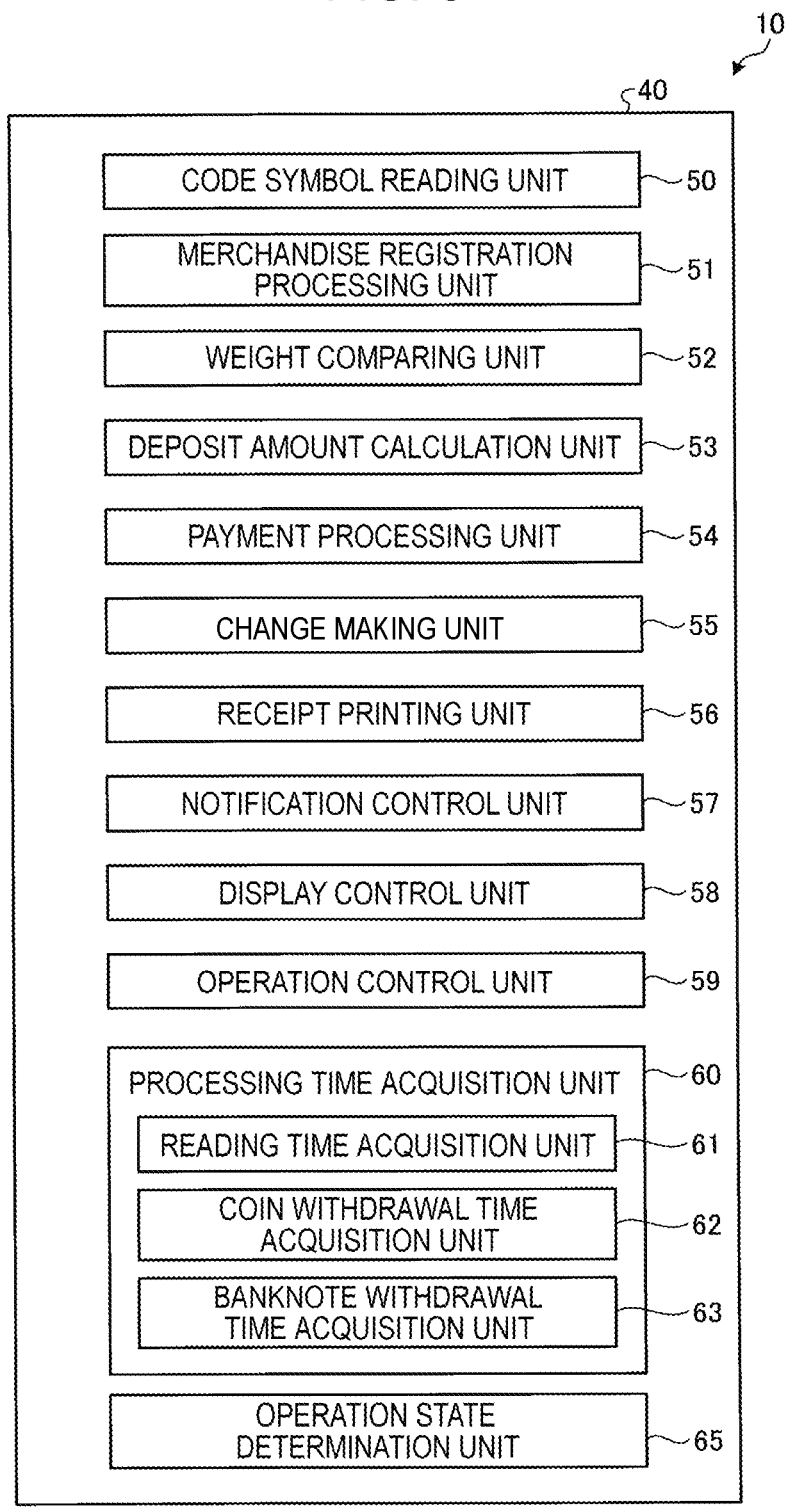
FIG. 3 is a block diagram depicting functional aspects of a self-service POS terminal in a first embodiment.

Next, a functional configuration of the self-service POS terminal 10 will be described with reference to FIG. 3. FIG. 3 is a block diagram illustrating an example of the functional configuration of the self-service POS terminal 10 in the first embodiment.

The control unit 40 of the self-service POS terminal 10 loads the control program P1 onto the RAM 43 and then executes the instructions of the control program P1 to functionally realize, as depicted in FIG. 3, a code symbol reading unit 50, a merchandise registration processing unit 51, a weight comparing unit 52, a deposit amount calculation unit 53, a payment processing unit 54, a change making unit 55, a receipt printing unit 56, a notification control unit 57, a display control unit 58, an operation control unit 59, a processing time acquisition unit 60, and an operation state determination unit 65.

The code symbol reading unit 50 functions to read a code symbol on an item of merchandise by use of the scanner 13 or the handy scanner 14. The code symbol is, for example, a barcode or a two-dimensional code.

The merchandise registration processing unit 51 registers merchandise being purchased by a customer and calculates the total amount due for the registered merchandise.

The weight comparing unit 52 compares the weight measured by the weighing device 16 to the weight measured by the weighing device 17.

The deposit amount calculation unit 53 calculates the total amount of money tendered by the customer at settlement. The total amount can be obtained by summing up the total value of the banknotes deposited in the banknote deposit and withdrawal device 20 and the total value of the coins deposited in the coin deposit and withdrawal device 21.

The payment processing unit 54 performs payment processing of purchase amount calculated based on merchandise registration by the merchandise registration processing unit 51.

The change making unit 55 compares the total value of the inserted banknotes and coins to the purchase amount for the registered merchandise and calculates the change due amount. The change making unit 55 withdraws (ejects) banknotes from the banknote deposit and withdrawal device 20 according to the calculated change due amount. The change making unit 55 withdraws (ejects) coins from the coin deposit and withdrawal device 21 according to the calculated change due amount.

The receipt printing unit 56 prints details of the payment made using the payment processing unit 54 using the receipt printer 19 to dispense a receipt.

The notification control unit 57 makes a notification using the warning lamp 22, for example, when an operation performed in the self-service POS terminal 10 has a problem, when the operation of the self-service POS terminal 10 has a problem, or when a salesclerk is called. When one of the above-described situations occurs, the notification control unit 57 can also notify the store server of the situation.

The display control unit 58 controls the information to be displayed on the display 11.

The operation control unit 59 detects details of an input operation performed on the touch panel 12 or the like.

The processing time acquisition unit 60 acquires the processing time required for performing certain processes in the self-service POS terminal 10. The processing time acquisition unit 60 further includes a reading time acquisition unit 61, a coin withdrawal time acquisition unit 62, and a banknote withdrawal time acquisition unit 63.

The reading time acquisition unit 61 acquires the time required for the scanner 13 or the handy scanner 14 to read a code symbol. A timer in the CPU 41 measures the reading time.

The coin withdrawal time acquisition unit 62 acquires the time required for the coin deposit and withdrawal device 21 to eject the coins due as change and acquires the total number of withdrawn coins. The time required to eject the coins due as change is the time from when the change making unit 55 provides an instruction to eject the coins due back for change until all the coins due are ejected. The total number of ejected coins can be identified when the change making unit 55 calculates coins to be withdrawn as change. A timer in the CPU 41 measures the time required to eject the coins.

The banknote withdrawal time acquisition unit 63 acquires a time required for the banknote deposit and withdrawal device 20 to eject the banknotes due back as change and acquires the total number of withdrawn banknotes. The time required to eject the banknotes due back is the time from when the change making unit 55 provides an instruction to eject the banknotes until all the banknotes due as change are ejected. The number of withdrawn banknotes is specified when the change making unit 55 calculates change amount due. A timer in the CPU 41 measures the time required to eject the banknotes.

The operation state determination unit 65 evaluates whether the scanner 13 or the handy scanner 14 has any sign of defective operation by comparing measured time required for reading a code symbol or the like using the scanner 13 or the handy scanner 14 to a reference time for reading a code symbol or the like using the scanner 13 or the handy scanner 14.

In an example, scanner 13 irradiates a code symbol with light emitted by a light emitting unit and then receives light reflected from the code symbol. In this manner, the scanner 13 receives an input of a monochrome pattern of the code symbol. Thus, when the surface of the reading window is dirty, marred, or otherwise degraded, emitted and returned light becomes weaker, and thus the light reflected from the code symbol useful for purposes of reading the code symbol becomes weaker. Accordingly, the apparent contrast of the monochrome pattern may be degraded. When the contrast of the monochrome pattern is degraded, generally, the reading time in the code symbol reading unit 50 increases. If the reading time is increased, the accounting process for the customer will be delayed by the extra reading time. Thus, it can become necessary to address the cause of the delay in the self-service POS terminal 10. Therefore, the operation state determination unit 65 compares the reading time (processing time) acquired by the reading time acquisition unit 61 to the reading time of the scanner 13 in normal operation (a reference time). When the reading time acquired by the reading time acquisition unit 61 is longer than the reference time, it can be determined that the scanner 13 has signs of defective operation, which may worsen in time if not addressed.

Like the scanner 13, the handy scanner 14 irradiates the code symbol with light from a light emitting unit and then receives light reflected from the code symbol. In this manner, the handy scanner 14 reads a monochrome pattern of the code symbol. Thus, when the light emitting unit is dirty, marred, or otherwise degraded, the light used for irradiation becomes weaker, and thus the light reflected from the code symbol becomes weaker. Accordingly, the contrast of the monochrome pattern may be degraded. When the contrast of the monochrome pattern is degraded, generally, the reading time in the code symbol reading unit 50 increases. When the reading time is increased, the accounting process for the customer is extended. Thus, it may become necessary to address the cause of the delay in the self-service POS terminal 10. Therefore, the operation state determination unit 65 compares the reading time (processing time) acquired by the reading time acquisition unit 61 to reference time for the handy scanner 14 when the self-service POS terminal 10 is operating normally. When the reading time acquired by the reading time acquisition unit 61 is longer than the reference time, it can be determined that the handy scanner 14 has signs of defective operation, which may worsen in time if not addressed.

The operation state determination unit 65 can also compare the withdrawal time per coin, which can be acquired by the coin withdrawal time acquisition unit 62, to the withdrawal time per coin when the coin deposit and withdrawal device 21 operates normally (a reference time for withdrawal time per coin). Thus, the operation state determination unit 65 can evaluate whether the coin deposit and withdrawal device 21 has any sign indicating that a failure is likely to occur in the future based on the comparison of the present withdrawal time per coin to the reference time.

The coins ejected by the coin deposit and withdrawal device 21 are conveyed to the coin ejection port 38 (see FIG. 1) by a belt driven by a drive roller or the like. When the belt is contaminated, or the drive roller slows down due to deterioration over time, the conveyance speed of the coin is decreased, and thus the withdrawal time per coin increases. When the withdrawal time of the coin increases, the accounting process for the customer is delayed by the extra time. Thus, it can become necessary to address the cause of the delay in the self-service POS terminal 10. Therefore, the operation state determination unit 65 evaluates whether there is a sign indicating that a failure is likely to occur in the operation of the coin deposit and withdrawal device 2, by comparing the withdrawal time of the coins, acquired by the coin withdrawal time acquisition unit 62, to the reference time for coin withdrawal. In general, the withdrawal time increases as the number of coins being withdrawn increases. Thus, the operation state determination unit 65 performs the determination on a per coin basis. When the withdrawal time per coin, which is acquired by the coin withdrawal time acquisition unit 62 is equal to or longer than a reference time, the operation state determination unit 65 can determine that the coin deposit and withdrawal device 21 has an early sign of a defective operation.

The operation state determination unit 65 also determines whether there is any sign indicating that a problem is likely to occur in the banknote deposit and withdrawal device 20, by comparing the withdrawal time per banknote, which is acquired by the banknote withdrawal time acquisition unit 63 to a reference time for banknote withdrawal.

The banknotes ejected as change by the banknote deposit and withdrawal device 20 are ejected by being conveyed to the banknote deposit and withdrawal port 36 (see FIG. 1) by a belt driven by a drive roller or the like. When the belt is contaminated, or the drive roller slows down due to deterioration over time, the conveyance speed of the banknote is decreased, and the withdrawal time per banknote increases. When the withdrawal time of the banknote increases, the accounting process for the customer is delayed. Thus, it can become necessary address the cause of the delay in the self-service POS terminal 10. The operation state determination unit 65 evaluates whether there is any sign indicating that a problem is likely to occur in the banknote deposit and withdrawal device 20 by comparing the measured withdrawal time of the banknote, which is acquired by the banknote withdrawal time acquisition unit 63, to a reference time for the withdrawal of a banknote. In general, the time required for withdrawal of banknotes increases as the number of banknotes to be withdrawn increases. Thus, the operation state determination unit 65 performs the determination on per banknote basis. When the measured withdrawal time per banknote is equal to or longer than the reference time for withdrawal time of a banknote, the operation state determination unit 65 determines that the banknote deposit and withdrawal device 20 has an early sign of a defective operation.

Description of Flow of Process Performed by Self-Service POS Terminal

Figure 4:
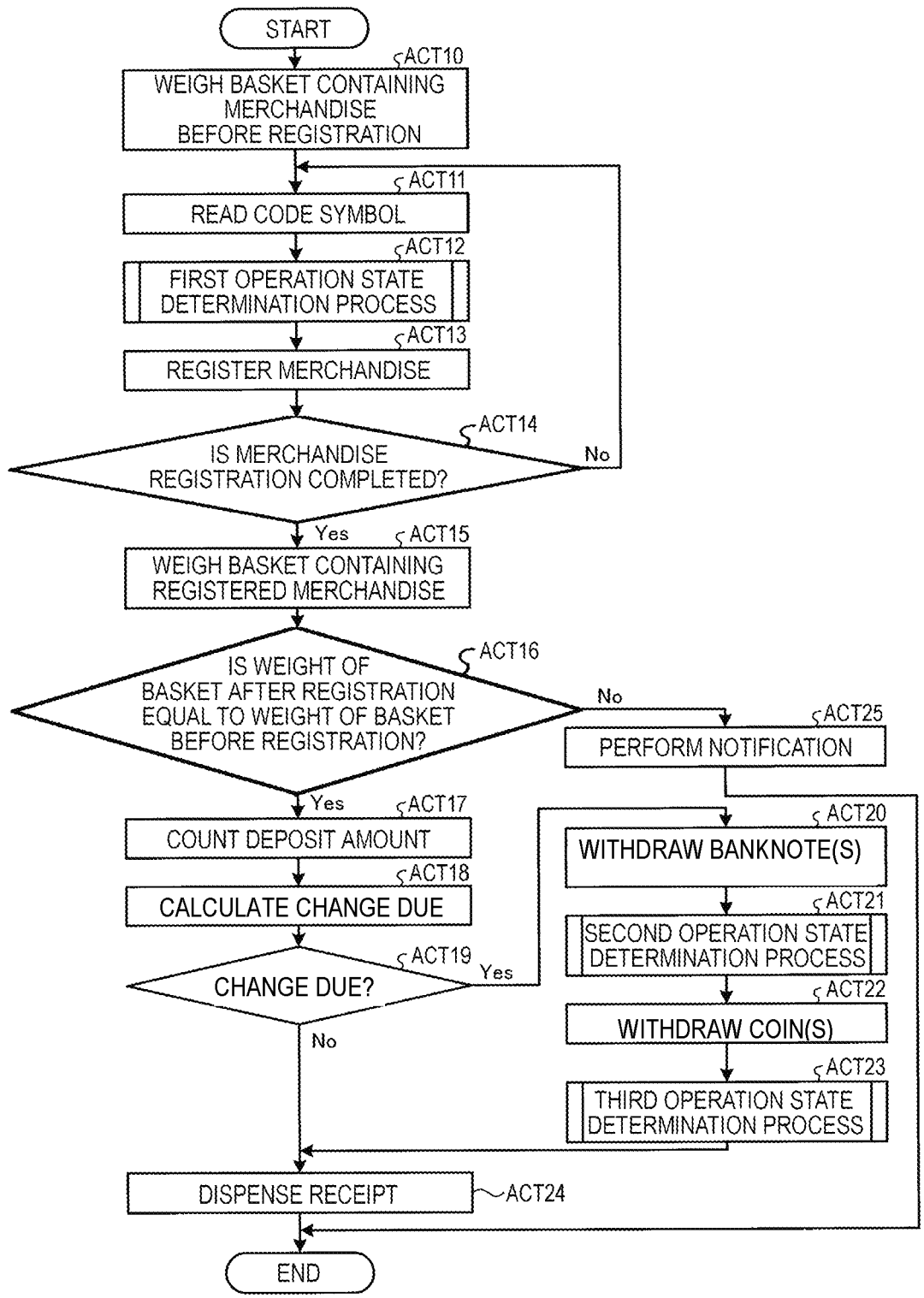
FIG. 4 is a flowchart of a process performed by a self-service POS terminal in a first embodiment.

Next, a flow of a process performed by the self-service POS terminal 10 will be described with reference to FIG. 4. FIG. 4 is a flowchart of a process performed by the self-service POS terminal in the first embodiment.

The weight comparing unit 52 measures the weight of a basket containing merchandise before registration using the weighing device 16 (Act 10).

The code symbol reading unit 50 reads a code symbol attached to an item of merchandise with the scanner 13 or the handy scanner 14 (Act 11).

The processing time acquisition unit 60 and the operation state determination unit 65 perform a first operation state determination process on the reading time of the scanner 13 or the handy scanner 14 (Act 12). The detailed flow of the first operation state determination process will be described later (see FIG. 5).

The merchandise registration processing unit 51 collates a merchandise code encoded in the code symbol as read by the code symbol reading unit 50 with the merchandise master file M, and registers the merchandise being purchased by the customer (Act 13).

The merchandise registration processing unit 51 determines whether merchandise registration has been completed (Act 14). When the merchandise registration is completed (Act 14: Yes), the process proceeds to Act 15. When the merchandise registration is not completed (Act 14: No), the process returns to Act 11. Whether the merchandise registration has been completed may be determined, for example, when a subtotal key is pressed on the touch panel 12.

When Yes is determined in Act 14, the weight comparing unit 52 measures the weight the registered merchandise using the weighing device 17 (Act 15).

The weight comparing unit 52 determines whether the weights of the merchandise before and after registration are equal to each other (Act 16). When the weights are equal to each other (Act 16: Yes), the process proceeds to Act 17. When the weights are not equal to each other (Act 16: No), the process proceeds to Act 25. A known weight of the basket can be compensated for in the comparison process.

When Yes is determined in Act 16, the deposit amount calculation unit 53 counts the deposited amount of money (Act 17). The customer inserts banknotes and/or coins for payment, and then presses an insertion completion button displayed on the touch panel 12 or the like. The deposit amount calculation unit 53 counts the total value of the inserted banknotes and/or the coins after the insertion completion button is pressed.

Then, the change making unit 55 compares the total value corresponding to the inserted banknotes and coins to the purchase amount of the merchandise and calculates the change due (Act 18).

The change making unit 55 determines whether there is a change due back to the customer (Act 19). When there is change due back (Act 19: Yes), the process proceeds to Act 20. When no change is due back to the customer (Act 19: No), the process proceeds to Act 24.

When Yes is determined in Act 19, the change making unit 55 withdraws banknotes to make change as necessary from the banknote deposit and withdrawal device 20 (Act 20).

The processing time acquisition unit 60 and the operation state determination unit 65 perform a second operation state determination process on the banknote withdrawal time of the banknote deposit and withdrawal device 20 (Act 21). The flow of the second operation state determination process will be described further below (see FIG. 6).

The change making unit 55 withdraws the coins due back as change from the coin deposit and withdrawal device 21 as necessary (Act 22).

The processing time acquisition unit 60 and the operation state determination unit 65 perform a third operation state determination process on the coin withdrawal time of the coin deposit and withdrawal device 21 (Act 23). The flow of the third operation state determination process will be described further below (see FIG. 7).

Although not specifically illustrated in FIG. 4, when there is no banknote due as change, the processes of Acts 20 and 21 are skipped. When there is no coin due as change, the processes of Acts 22 and 23 are skipped.

Subsequent to Act 23, or when No is determined in Act 19, the receipt printing unit 56 dispenses a receipt (Act 24). Then, the self-service POS terminal 10 ends the process depicted in FIG. 4.

When No is determined in Act 16, the notification control unit 57 causes the warning lamp 22 to emit light and calls a salesclerk in the vicinity. The salesclerk goes to the self-service POS terminal 10 and checks a situation of the customer. Then, the self-service POS terminal 10 ends the process depicted in FIG. 4.

Description of Flow of First Operation State Determination Process

Figure 5:
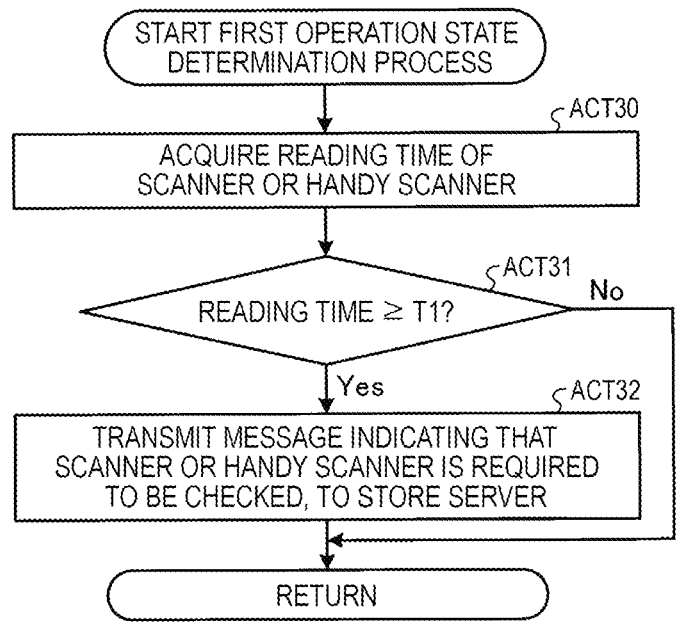
FIG. 5 is a flowchart of a first operation state determination process performed by a self-service POS terminal in a first embodiment.

Next, a flow of the first operation state determination process will be described with reference to FIG. 5. FIG. 5 is a flowchart of the first operation state determination process performed by the self-service POS terminal 10 in the first embodiment.

The reading time acquisition unit 61 acquires the reading time of the scanner 13 or the reading time of the handy scanner 14 (Act 30).

The operation state determination unit 65 determines whether the reading time acquired in Act 30 is equal to or longer than a threshold time T1 (Act 31). When the reading time is equal to or longer than the threshold time T1 (Act 31: Yes), the process proceeds to Act 32. When the reading time less than the threshold time T1 (Act 31: No), the process returns to Act 13 in FIG. 4. The threshold time T1 can be acquired in advance based on the reading time of the scanner 13 or the reading time of the handy scanner 14 during normal and/or previous operations of the self-service terminal 10. The threshold time T1 is an example of a reference time.

When Yes is determined in Act 31, the notification control unit 57 transmits information to the store server indicating that the scanner 13 or the handy scanner 14 is required to be checked (Act 32). Then, the process returns to Act 13 in FIG. 4.

The scanner 13 and the handy scanner 14 are different devices from each other. Thus, the process depicted in FIG. 5 can be performed on each of the scanner 13 and the handy scanner 14.

Description of Flow of Second Operation State Determination Process

Figure 6:
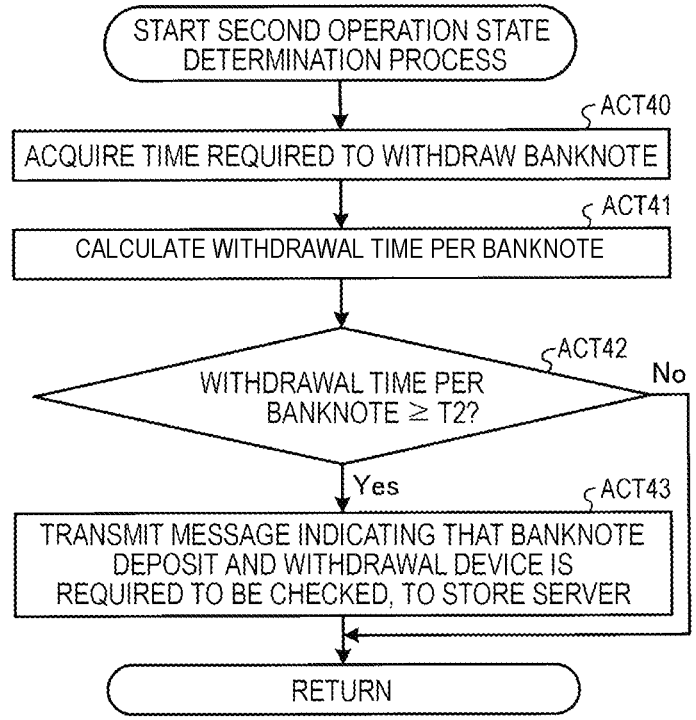
FIG. 6 is a flowchart of a second operation state determination process performed by a self-service POS terminal in a first embodiment.

Next, a flow of the second operation state determination process will be described with reference to FIG. 6. FIG. 6 is a flowchart of the second operation state determination process performed by the self-service POS terminal in the first embodiment.

The banknote withdrawal time acquisition unit 63 acquires the withdrawal time required for the banknote deposit and withdrawal device 20 to eject the banknotes (Act 40).

The banknote withdrawal time acquisition unit 63 calculates the withdrawal time per banknote by dividing the withdrawal time acquired in Act 40 by the number of withdrawn banknotes (Act 41).

The operation state determination unit 65 determines whether the withdrawal time per banknote, which is calculated in Act 41, is equal to or longer than a threshold time T2 (Act 42). When the withdrawal time per banknote is equal to or longer than the threshold time T2 (Act 42: Yes), the process proceeds to Act 43. When the withdrawal time per banknote is less than the threshold time T2 (Act 42: No), the process returns to Act 22 in FIG. 4. The threshold time T2 can be acquired in advance when the self-service POS terminal 10 operates normally or otherwise. That is, the threshold time T2 is a reference time.

When Yes is determined in Act 42, the notification control unit 57 transmits information to the store server indicating that the banknote deposit and withdrawal device 20 is required to be checked (Act 43). Then, the process returns to Act 22 in FIG. 4.

Description of Flow of Third Operation State Determination Process

Figure 7:
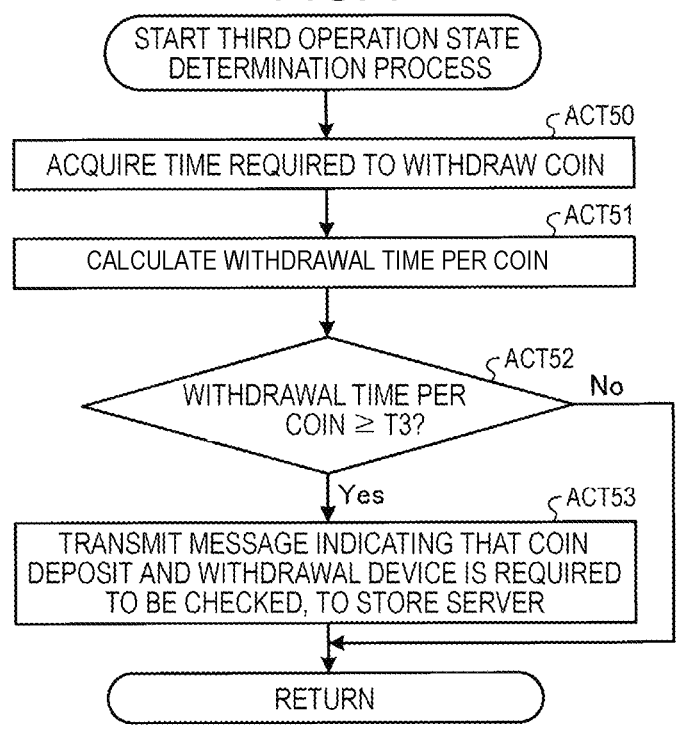
FIG. 7 is a flowchart of a third operation state determination process performed by a self-service POS terminal in a first embodiment.

Next, a flow of the third operation state determination process will be described with reference to FIG. 7. FIG. 7 is a flowchart of the third operation state determination process performed by the self-service POS terminal in the first embodiment.

The coin withdrawal time acquisition unit 62 acquires the withdrawal time required for the coin deposit and withdrawal device 21 to eject the coins due back as change (Act 50).

The coin withdrawal time acquisition unit 62 calculates the withdrawal time on per coin basis by dividing the withdrawal time acquired in Act 50 by the number of ejected coins (Act 51).

The operation state determination unit 65 determines whether the withdrawal time per coin is equal to or longer than a threshold time T3 (Act 52). When the withdrawal time per coin is equal to or longer than the threshold time T3 (Act 52: Yes), the process proceeds to Act 53. When the withdrawal time per coin is less than the threshold time T3 (Act 52: No), the process returns to Act 24 in FIG. 4. The threshold time T3 can be acquired in advance when the self-service POS terminal 10 operates normally or can be otherwise determined. The threshold time T3 is an example of a reference time.

When Yes is determined in Act 52, the notification control unit 57 transmits information to the store server indicating that the coin deposit and withdrawal device 21 is required to be checked (Act 53). Then, the process returns to Act 24 in FIG. 4.

As described above, in the self-service POS terminal 10 in the first embodiment, the processing time acquisition unit 60 acquires the processing time required for performing certain specific processes during active operation of the self-service POS terminal 10. The operation state determination unit 65 determines whether there is a sign indicating that a problem is likely to occur in the operation of the self-service POS terminal 10 by comparing the processing time acquired by the processing time acquisition unit 60 to the relevant threshold times T1, T2, or T3 (reference times). Thus, it is possible to detect an early sign of a defective operation during the active operations of the self-service POS terminal 10 by customers or the like.

In the self-service POS terminal 10 in the first embodiment, potential problems in the scanner 13, the handy scanner 14, the banknote deposit and withdrawal device 20, and the coin deposit and withdrawal device 21 can be detected early without removing the self-service POS terminal from active service.

A manager of the store server who receives a transmitted message indicating that there is a possible sign of defective operation may then check the self-service POS terminal 10 upon receiving a report indicating that there is a sign of a defective operation. Alternatively, the manager may periodically check whether a report indicating that there is a sign of a defective operation has been received or status reports may be periodically sent to the manager, for example, at store closing time, monthly or the like.

As described above, a self-service POS terminal 10 was described as an example embodiment. The present disclosure may be similarly applied to a face-to-face type POS and/or a semi-self-service-type POS.

The specific processes to be evaluated is not limited to the above-described processes. For example, any process for which the processing time is important and expected to degrade with use or the like, such as the reading time of the card reader 18 may be similarly evaluated and monitored.

Second Embodiment

Figure 8:
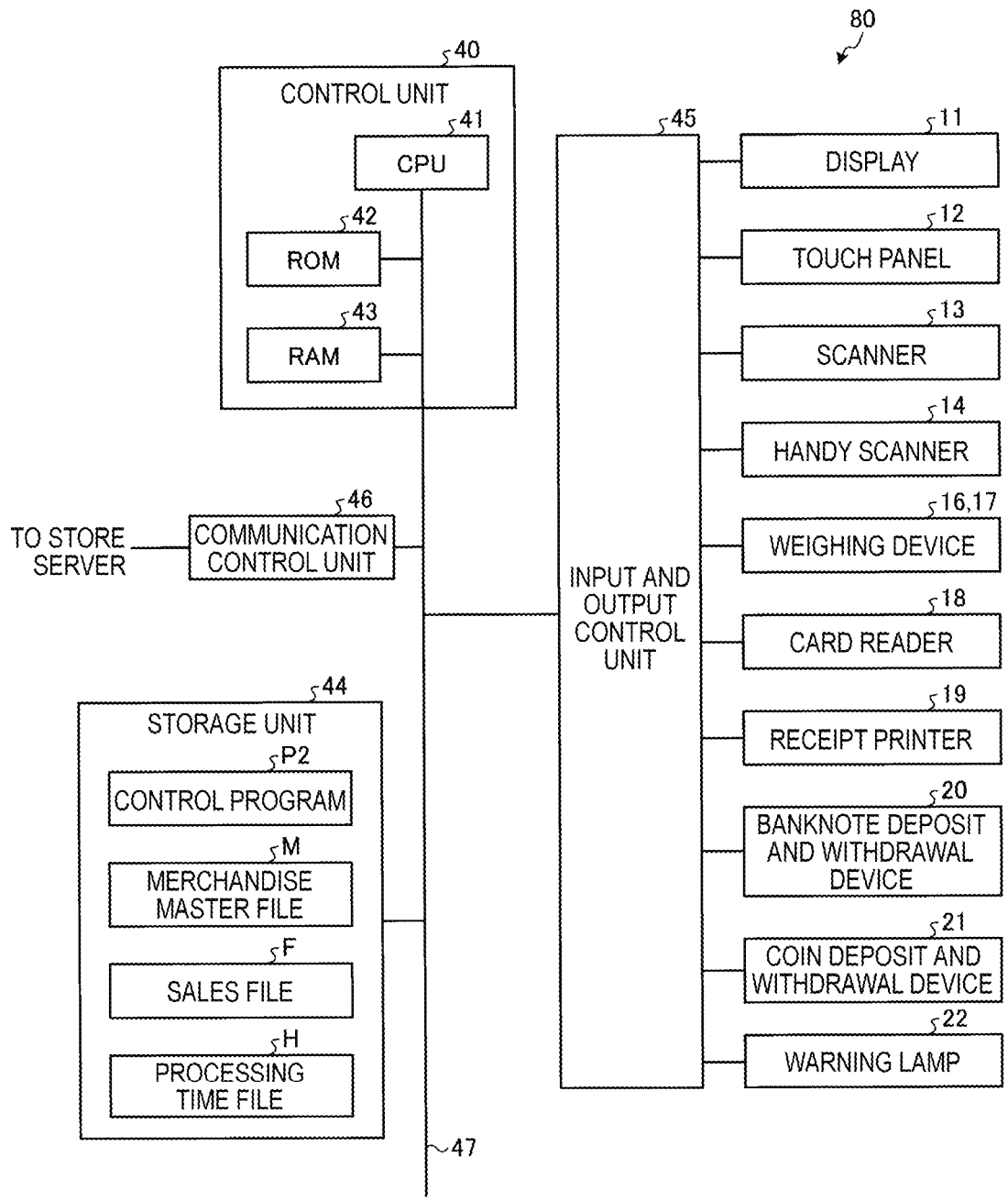
FIG. 8 is a block diagram illustrating aspects of a self-service POS terminal according to a second embodiment.

Next, as a second embodiment, a self-service POS terminal 80 having a function of accumulating a time required for a predetermined process and detecting a sign of a defective operation based on the accumulated time will be described.
Description of Hardware Configuration of Self-Service POS Terminal Firstly, a hardware configuration of the self-service POS terminal 80 according to the second embodiment will be described with reference to FIG. 8. FIG. 8 is a block diagram illustrating an example of the hardware configuration of the self-service POS terminal in the second embodiment. The self-service POS terminal 80 has a similar hardware configuration as the self-service POS terminal 10 (see FIG. 2) except for an internal configuration of the storage unit 44. Thus, in the following description of self-service POS terminal 80, the hardware components substantially similar to those in the self-service POS terminal 10 are denoted by the same reference symbols as used in the previous description.

The storage unit 44 stores a control program P2 instead of the control program P1. The control program P2 is a program for realizing the described functions of the self-service POS terminal 80.

Figure 9:
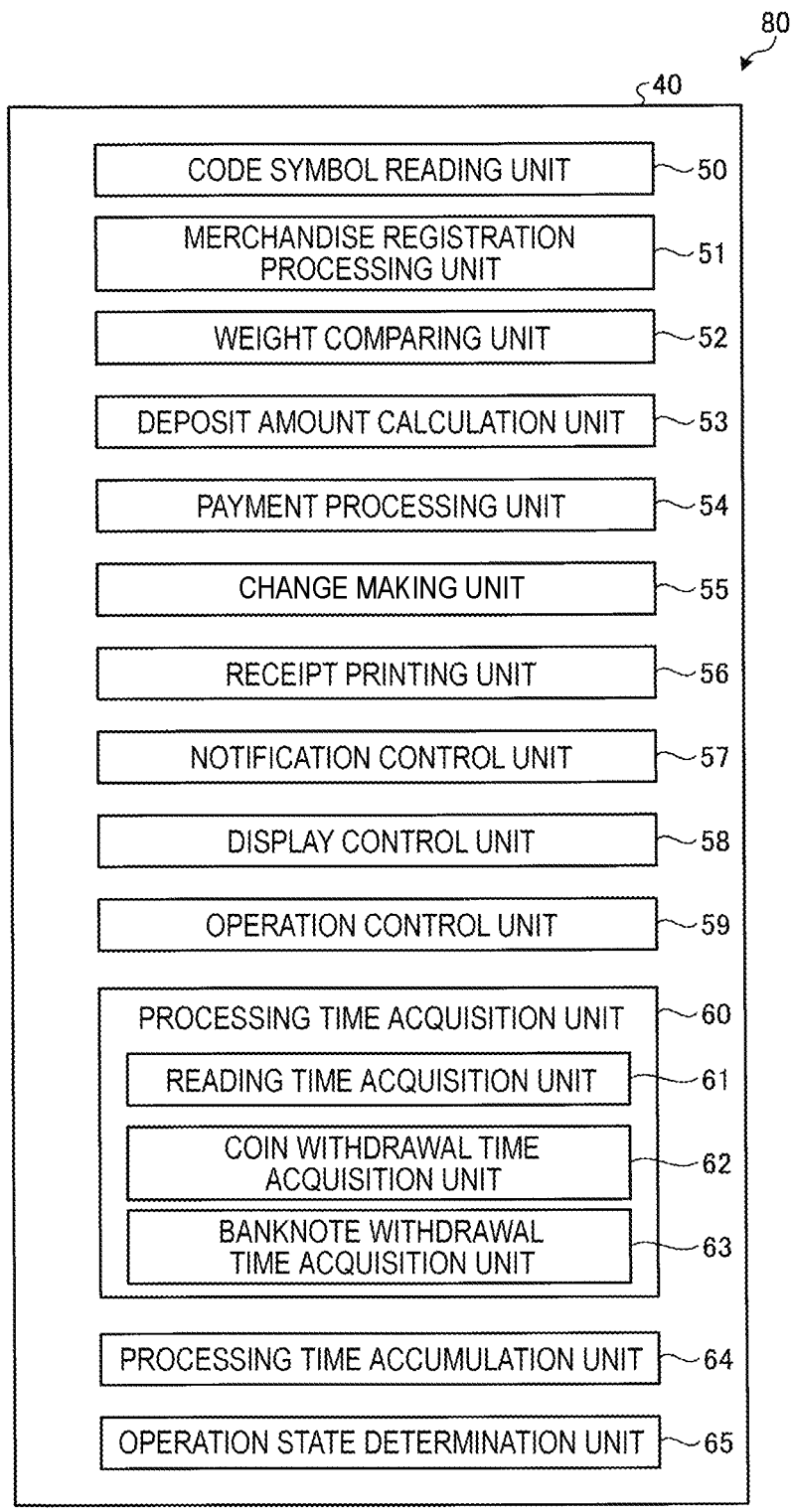
FIG. 9 is a block diagram of functional aspects of a self-service POS terminal in a second embodiment.

The storage unit 44 stores a processing time file H. The processing time file H is a file in which the time required for the self-service POS terminal 80 to perform a specific process is accumulated over time for repeated performances of the specific process. In this context, the specific process can be the reading time of the scanner 13 or the handy scanner 14, the time taken for the banknote deposit and withdrawal device 20 to eject a banknote (withdrawal time per banknote), or the time taken for the coin deposit and withdrawal device 21 to eject a coin (withdrawal time per coin). The storage unit 44 can stores the time required for each of the specific processes.
Description of Functional Configuration of Self-Service POS Terminal Next, a functional configuration of the self-service POS terminal 80 in the second embodiment will be described with reference to FIG. 9. FIG. 9 is a block diagram illustrating an example of the functional configuration of the self-service POS terminal 80 in the second embodiment.

The control unit 40 (see FIG. 8) in the self-service POS terminal 80 loads the control program P2 onto the RAM 43 and then executes the control program to realize functional units illustrated in FIG. 9. The functional configuration illustrated in FIG. 9 adds a processing time accumulation unit 64 to the functional configuration (see FIG. 3) of the self-service POS terminal 10. Thus, in the following description, those functional components that are substantially similar to those in the self-service POS terminal 10 are denoted by the same reference symbol.

The processing time accumulation unit 64 stores the processing times acquired by the processing time acquisition unit 60. The processing times are the times required for the self-service POS terminal 80 to perform one of the specific processes discussed above.

The operation state determination unit 65 evaluates whether there is an early sign of a defective operation in the self-service POS terminal 80 by comparing the most recent processing time acquired by the processing time acquisition unit 60 for a specific process to an average time for the specific process, which can be stored in the processing time accumulation unit 64.
Description of Flow of Process Performed by Self-Service POS Terminal A flow of a process performed by the self-service POS terminal 80 is similar to the flow (see FIG. 4) of the process performed by the self-service POS terminal 10. Only certain process details of the first operation state determination process (Act 12), the second operation state determination process (Act 21), and the third operation state determination process (Act 23), which were illustrated in FIG. 4, are different from those in the first embodiment.

Figure 10:
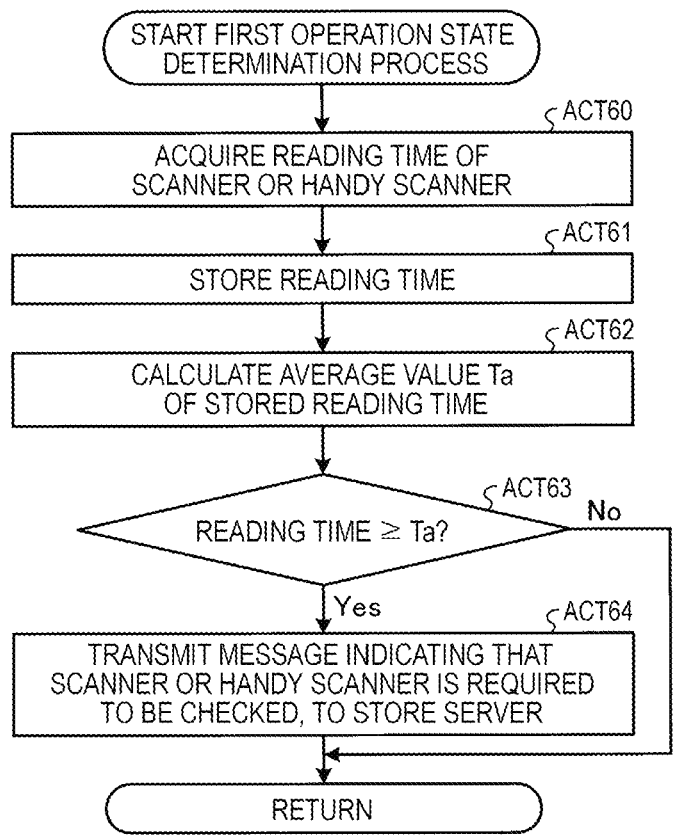
FIG. 10 is a flowchart of a first operation state determination process performed by a self-service POS terminal in a second embodiment.

That is, in the first embodiment, the self-service POS terminal 10 determines whether the self-service POS terminal 10 has an early sign of a defective operation by comparing the measured processing time to a fixed threshold value (reference time). However, in the second embodiment, the self-service POS terminal 80 determines whether the self-service POS terminal 80 has an early sign of a defective operation by comparing the measured processing time for one of the specific processes to the times which are accumulated by the processing time accumulation unit 64 for the specific process. An, an average time of each specific process can be calculated based on the times stored by the processing time accumulation unit 64.
Description of Flow of First Operation State Determination Process Next, a flow of the first operation state determination process performed by the self-service POS terminal 80 will be described with reference to FIG. 10. FIG. 10 is a flowchart of the first operation state determination process performed by the self-service POS terminal 80 in the second embodiment.

The reading time acquisition unit 61 acquires the reading time of the scanner 13 or the reading time of the handy scanner 14 (Act 60).

The processing time accumulation unit 64 stores the reading time acquired in Act 60 in the processing time file H (Act 61).

The operation state determination unit 65 calculates an average time (threshold time) Ta for the reading time of the scanner 13 or the reading time of the handy scanner 14, which are stored in the processing time file H (Act 62).

The operation state determination unit 65 determines whether the reading time acquired in Act 60 is equal to or longer than the average time Ta (Act 63). When reading time is equal to or longer than the average time Ta (Act 63: Yes), the process proceeds to Act 64. When the reading time less than the average time Ta (Act 63: No), the process returns to Act 13 in FIG. 4.

When Yes is determined in Act 63, the notification control unit 57 transmits information to the store server indicating that the scanner 13 or the handy scanner 14 is required to be checked (Act 64). Then, the process returns to Act 13 in FIG. 4.

The scanner 13 and the handy scanner 14 are different devices from each other. Thus, the process depicted in FIG. 10 is performed for each of the scanner 13 and the handy scanner 14.

Description of Flow of Second Operation State Determination Process

Figure 11:
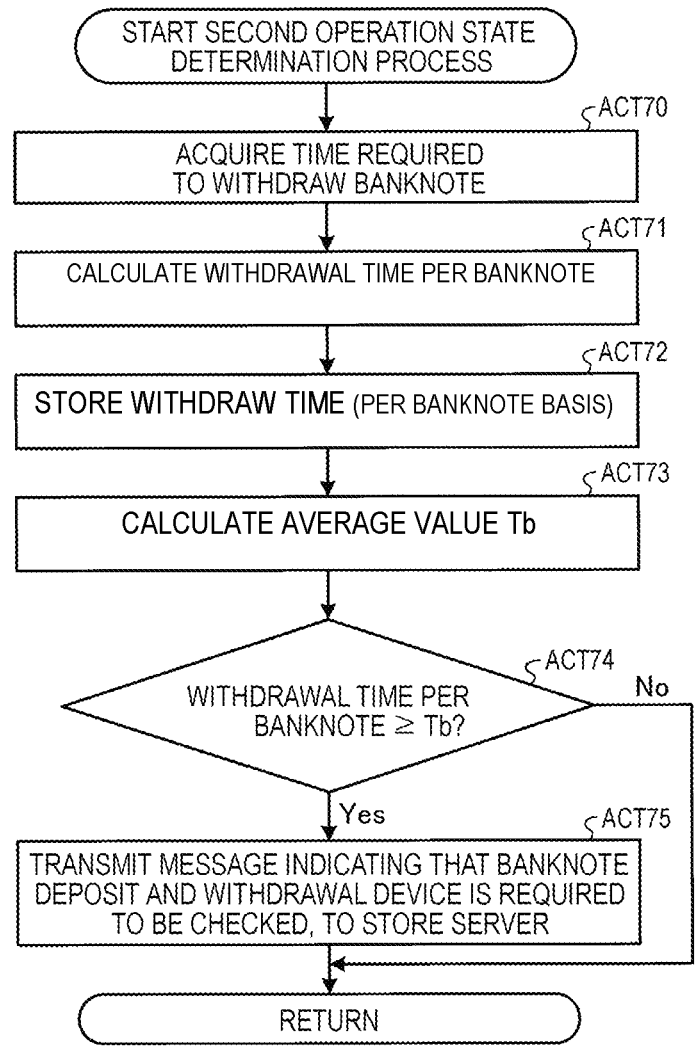
FIG. 11 is a flowchart of a second operation state determination process performed by a self-service POS terminal in a second embodiment.

Next, a flow of the second operation state determination process performed by the self-service POS terminal 80 will be described with reference to FIG. 11. FIG. 11 is a flowchart of the second operation state determination process performed by the self-service POS terminal in the second embodiment.

The banknote withdrawal time acquisition unit 63 acquires the withdrawal time required for the banknote deposit and withdrawal device 20 to eject the banknotes for change due (Act 70).

The banknote withdrawal time acquisition unit 63 calculates the withdrawal time per banknote by dividing the withdrawal time acquired in Act 70 by the number of withdrawn banknotes (Act 71).

The processing time accumulation unit 64 stores the withdrawal time per banknote, which is calculated in Act 71, in the processing time file H (Act 72).

The operation state determination unit 65 calculates an average time (threshold time) Tb of the withdrawal time per banknote, which is stored in the processing time file H (Act 73).

The operation state determination unit 65 determines whether the withdrawal time per banknote, which is calculated in Act 71 is equal to or longer than the average time Tb (Act 74). When the withdrawal time per banknote is equal to or longer than the average time Tb (Act 74: Yes), the process proceeds to Act 75. When the withdrawal time per banknote is less than the average time Tb (Act 74: No), the process returns to Act 22 in FIG. 4.

When Yes is determined in Act 74, the notification control unit 57 transmits information to the store server indicating that the banknote deposit and withdrawal device 20 is required to be checked (Act 75). Then, the process returns to Act 22 in FIG. 4.

Description of Flow of Third Operation State Determination Process

Figure 12:
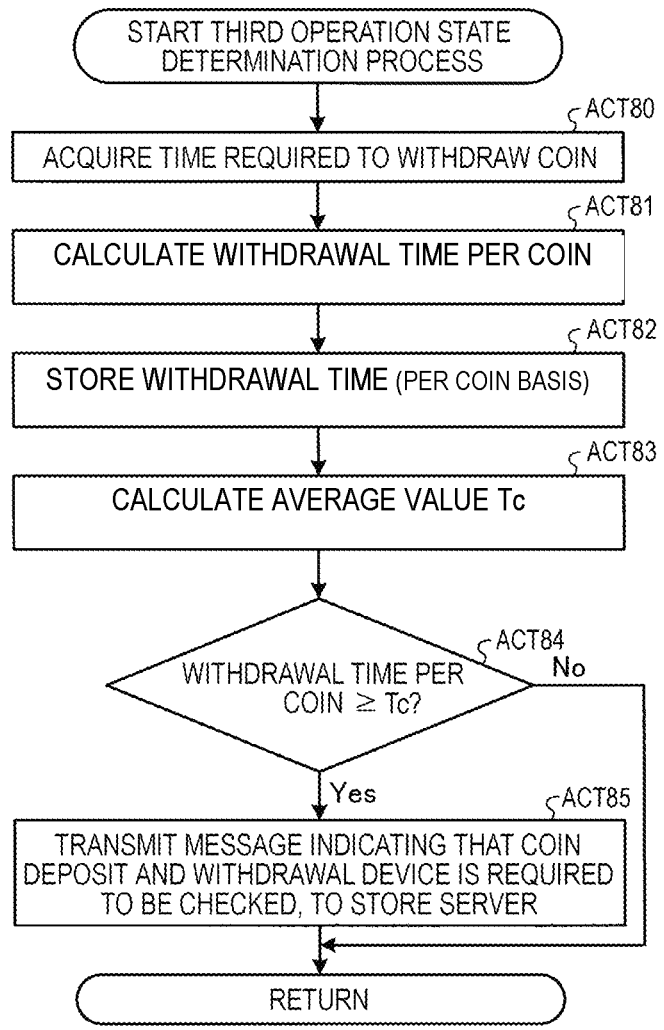
FIG. 12 is a flowchart of a third operation state determination process performed by a self-service POS terminal in a second embodiment.

Next, a flow of the third operation state determination process performed by the self-service POS terminal 80 will be described with reference to FIG. 12. FIG. 12 is a flowchart of the third operation state determination process performed by the self-service POS terminal 80 in the second embodiment.

The coin withdrawal time acquisition unit 62 acquires the withdrawal time required for the coin deposit and withdrawal device 21 to eject the coins due as change (Act 80).

The coin withdrawal time acquisition unit 62 calculates the withdrawal time per coin by dividing the withdrawal time acquired in Act 80 by the number of withdrawn coins (Act 81).

The processing time accumulation unit 64 stores the withdrawal time per coin, which is calculated in Act 81, in the processing time file H (Act 82).

The operation state determination unit 65 calculates an average time (threshold time) Tc of the withdrawal time per coin, which is stored in the processing time file H (Act 83).

The operation state determination unit 65 determines whether the withdrawal time per coin, which is calculated in Act 81 is equal to or longer than the average time Tc (Act 84). When the withdrawal time per coin is equal to or longer than the average time Tc (Act 84: Yes), the process proceeds to Act 85. When the withdrawal time per coin is less than the average time Tc (Act 84: No), the process returns to Act 24 in FIG. 4.

When Yes is determined in Act 84, the notification control unit 57 transmits information to the store server indicating that the coin deposit and withdrawal device 21 is required to be checked (Act 85). Then, the process returns to Act 24 in FIG. 4.

In FIGS. 10 to 12, the operation state determination unit 65 calculates the average time Ta, Tb, or Tc obtained by adding the latest processing time acquired by the processing time acquisition unit 60. In other examples, an average time calculated without the latest processing time being added may be used.

As described above, in the self-service POS terminal 80 in the second embodiment, the processing time acquisition unit 60 acquires the processing time required for performing a specific process. The operation state determination unit 65 determines whether there is any sign indicating that a problem is likely to occur in the operation of the self-service POS terminal 80 by comparing the measured respective processing time to the average time Ta, Tb, or Tc based on the times previously accumulated by the processing time accumulation unit 64. Thus, it is possible to detect an early sign of a defective operation while the self-service POS terminal 80 is in active service.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A point-of-sale terminal, comprising:
an optical scanner configured to read code symbols on merchandise being registered in a sales transaction;
a currency handling device configured to dispense a bill as change to a customer in the sales transaction;
a coin handling device configured to dispense a coin as change to the customer in the sales transaction; and
a processor configured to:
acquire the time required for the optical scanner to read a code symbol in the sales transaction;

acquire the time required for the currency handling device to dispense the bill as change to the customer in the sales transaction;

acquire the time required for the coin handling device to dispense the coin as change to the customer in the sales transaction;

determine whether the time required for the optical scanner to read the code symbol exceeds a first reference time and output a notification if so;

determine whether the time required for the currency handling device to dispense the bill as change to the customer exceeds a second reference time and output a notification if so; and determine whether the time required for the coin handling device to dispense the coin as change to the customer exceeds a third reference time and output a notification if so.

2. The point-of-sale terminal according to claim 1, wherein the first reference time is calculated using a plurality of previously acquired times required for the optical scanner to read a code symbol in a plurality of different sales transactions.

3. The point-of-sale terminal according to claim 1, wherein the second reference time is calculated using a plurality of previously acquired times required for the currency handling device to dispense a bill as change in a plurality of different sales transactions.

4. The point-of-sale terminal according to claim 1, wherein the third reference time is calculated using a plurality of previously acquired times required for the coin handling device to dispense a coin as change in a plurality of different sales transactions.

5. The point-of-sale terminal according to claim 1, the first reference time is a first fixed value, the second reference time is a second fixed value, and the third reference time is a third fixed value.

6. The point-of-sale terminal according to claim 1, wherein the optical scanner is a hand-held type scanner.

\* \* \* \* \*